United States Patent [19]

Brock, deceased

[11] 3,936,536

[45] Feb. 3, 1976

[54] METHOD OF MAKING RUBBER-COATED WIRE

[75] Inventor: Marlyn J. Brock, deceased, late of Akron, Ohio, by Betty R. Brock, executrix

[73] Assignee: The Firestone Tire & Rubber Company, Akron, Ohio

[22] Filed: Feb. 13, 1974

[21] Appl. No.: 442,257

[52] U.S. Cl.......... 427/229; 152/361 R; 156/110 A; 156/124; 427/388; 427/406; 427/409; 427/413; 427/419; 428/380; 428/381; 428/382; 428/389

[51] Int. Cl.$^2$.................. B05D 3/02; B05D 1/38

[58] Field of Search........ 117/71 M, 79, 128.7, 133, 117/162, 163; 156/110 A, 124; 161/143; 260/765, 762; 423/351; 427/229, 388, 406, 409, 413, 419; 428/380, 382, 389, 381; 152/361 R

[56] References Cited

UNITED STATES PATENTS

| | | | |
|---|---|---|---|
| 2,435,191 | 2/1948 | Adler | 117/71 M |
| 2,643,273 | 6/1953 | Wilkins | 117/133 X |
| 2,912,355 | 11/1959 | Formanek et al. | 260/762 X |
| 2,939,207 | 6/1960 | Adler | 117/71 M |
| 3,278,331 | 10/1966 | Taylor | 117/71 M |
| 3,600,221 | 8/1971 | Hibbs | 117/71 M |
| 3,674,445 | 7/1972 | Wlodek | 117/71 M |

OTHER PUBLICATIONS

Ashcroft et al., *Thermochemistry of Transition Metal Complexes*, pp. 226, 227, 238, 239, 260, (1970).

*Primary Examiner*—Harry J. Gwinnell

[57] ABSTRACT

Rubber is adhered to metal such as the metal in the belt of a vehicle tire or conveyor belt, by first coating the metal with rubber containing a small amount of the amine of cobaltous chloride, $CoCl_2 \cdot 2NH_3$. The metal may first be zinc coated.

1 Claim, No Drawings

METHOD OF MAKING RUBBER-COATED WIRE

Rubber is adhered to steel by first applying a zinc coating to the steel and then covering this with a vulcanizable rubber which contains a small amount of ammine complex of cobaltous chloride, $CoCl_2 \cdot 2NH_3$, which may contain 2 molecules of water. The ammine may be either the cis- or trans- form. The rubber-coated metal is then heated to cure the rubber and bond it to the metal.

It has been proposed to coat metal, such as tire-bead wire, with a cobalt-containing compound before bonding rubber to it. See, for instance, Gray U.S. Pat. No. 1,919,718, Banks et al. U.S. Pat. No. 2,599,359, Wilkins U.S. Pat. No. 2,643,273, Formanek et al. U.S. Pat. No. 2,912,355 and Adler U.S. Pat. No. 2,939,207.

The steel may be wire used in the plies or belt of an automobile tire, a flat steel plate to which rubber is to be affixed, or any one of a number of metal products or parts to which rubber is vulcanized. It has been customary to first coat steel with brass because rubber can be readily vulcanized to brass. A complex cyanide solution is needed to plate out the brass coating. The cyanide solution is poisonous and presents a health hazard. The disposal of the waste cyanide solution also presents a difficult problem. Zinc, on the other hand, can be applied by an electrolytic coating procedure and, furthermore, zinc coatings are softer than brass coatings and therefore the dies through which zinc-coated wire, etc. is passed have a much longer life than dies similarly employed on brass-coated wire, etc. Also storage of zinc-coated wire, etc. does not present the problems often present in the handling of brass which becomes oxidized in shipping or storage, because zinc oxide, which is formed on the surface of zinc, is favorable to rubber vulcanization.

Generally, the rubber compound will contain 0.1 to 5.0 parts of the complex per 100 parts of the rubber. It is necessary to compound carbon black in the rubber, the amount being used being dependent upon the kind of rubber, the amount of extender, etc. employed, and the use to which the rubber-coated product is to be put, but will usually be about 15 to 90, and preferably 40 to 80, parts per 100 parts of the rubber. The "parts" referred to are all on the basis of weight.

There are many other advantages inherent in the use of cobalt ammine complex in a rubber compound for adhering rubber to metal. Among these may be mentioned the fact that the complex is amorphous in character, contains a relatively large amount of cobalt and is readily dispersible in rubber compounds. It is possible to cure such rubber products in the presence of sulfur without the addition of a usual rubber accelerator because on heating the ammine gives off ammonia which acts as an accelerator. With or without an accelerator, the cobalt complex provides a slow rate of cure which permits the sulfur to become involved in the rubber-to-metal adhesive bond instead of being rapidly and completely used up in the formation of rubber cross-links such as occurs in highly accelerated rubber compounds.

With the wide use of steel wire and brass-coated steel wire for tire reinforcement (in bias-ply tires, radial-ply tires and in steel belts for tires), there is a demand for a strong adhesive which will withstand the intense, high-temperature flexing to which such wires are subjected. Adhesive coatings which contain cobalt ammine (which can contain two moles of water) have been found satisfactory, regardless of the rubber in the coating and the rubber which is adhered to the wire, which latter may be different from the rubber used in the coating. The adhesive may be used for coating metals other than the metal in tire components, as suggested in the cited patents, for example. The metal must be clean, free of grease, rust and scale.

The rubbers in the tire or other product and that in the wire coating may be the same or different. The latter may be composed largely or entirely of a diene rubber such as, for instance, natural rubber, polybutadiene, polyisoprene, butadiene-styrene copolymer, reclaimed rubber, etc. The rubber in the tire may be any rubber or mixture of rubbers usually used in tires, with the compounding ingredients usually present.

The rubber used for the wire coating is a curable rubber which includes compounding ingredients (often without any usual accelerator). It is found that it is necessary to use carbon black in the coating, and although generally the amount used will be within the range set forth in the following recipe, a larger or smaller amount may be used, and the amount of oil or pine tar or other extender will be varied accordingly. The recipe refers more particularly to the amounts of compounding ingredients usually employed; other amounts and other compounding ingredients may be used with other rubbers, as will be apparent to those skilled in the art.

Although the composition of the rubber used may vary with respect to the rubber, antioxidant, accelerator, extender, pigments, etc., used, it has been found that it should include carbon black to get good adhesion.

The following rubber formulae were used on coating zinc-coated and brass-coated steel samples and it is shown that the adhesion obtained on the zinc-plated steel is substantially as good as on the brass-plated steel.

|  | Formula A | Formula B |
| --- | --- | --- |
| Hevea | 100 | 100 |
| HAF Black* | 60 | 60 |
| Zinc Oxide | 7.5 | 7.5 |
| Ajone DD | 2.0 | 2.0 |
| Santoflex 13** | 0.9 | 0.9 |
| Stearic Acid | 0.5 | 3.4 |
| Pine Tar | 5.55 | 5.55 |
| Retarder (Vultrol) | 1.0 | 1.0 |
| Sulfur | 2.0 | 3.0 |
| Accelerator | 0.2 | 0.6 |
| Ammine of cobaltous chloride | 3.0 | 0.0 |

*High Abrasion Furnace Black
**Santoflex 13 is an N-alkyl-N'-aryl-p-phenylenediamine. Ajone DD is 6-dodecyl-1,2-dihydro-2,2,4-trimethyl quinoline. Vultrol is n-nitroso-diphenylamine.

In the T-adhesion test to which the following tests refer, cords twisted from 5 filaments of brass-coated and zinc-coated wire are used. Each filament is 0.010 inch in diameter. The diameter of the strand is 0.027 inch. One quarter inch of one end of such a strand is embedded between two pieces of the vulcanizable rubber compound to be tested. Then the rubber is cured at 300°F. for 30 minutes. Thus the end of the wire is held by one-fourth inch of rubber which is held in a clamp. The other end of the wire is pulled, and the value obtained by pulling is multiplied by 4 to obtain the strength of the bond between the wire and the rubber in pounds per inch.

T-adhesion tests were made on samples prepared according to the above two recipes, adhered to zinc-coated wire and to brass-coated wire and the samples were heated to 230°F. for testing. No heating is necessary to promote the adhesion. The results are given below:

|  | Tests on Brass-Coated Steel Wire | |
|---|---|---|
|  | Coating Formula A | Coating Formula B |
| Unaged | 145 | 175 |
| Aged 4 days at 212°F. | 97 | 95 |
|  | Tests on Zinc-Coated Steel Wire | |
|  | Coating Formula A | Coating Formula B |
| Unaged | 180 | 0 |
| Aged 4 days at 212°F. | 104 | 0 |

These data indicate that a bond can be obtained to zinc-plated steelcord which is equivalent to a bond obtained to a brass-plated steelcord. This test also indicates that the ammine of cobaltous chloride is necessary for a bond to zinc.

Ammine complexes of other cobalt compounds may be used. Adhesion was obtained with cobalt urea and cobalt phosphothionate complexes and also Manobond C (a rubber additive of Monsanto Chemical Company used to improve the adhesive properties of the rubber). No satisfactory bond was obtained with the ammine complex of cobaltic chloride. It appears that using the ammine complex of cobaltous chloride, the carbon black catalyzes oxidation of $[Co^{+2}(NH_3)_29]^{+2}$ to $[Co^{+3}(NH_3)_2]^{+3}$ and on heating, ammonia is given off forming $[Co]^{+2}$, and the zinc plating is oxidized, effecting a good bond. If the temperature is too low, no ammonia (or insufficient ammonia) is given off. Temperatures in the range of 230° to 350°F may be used.

It is claimed that:

1. The method of adhering a sulfur-curable carbon black containing diene rubber compound to zinc-coated steel, which method comprises covering the zinc surface with a diene rubber containing substantially 15 to 90 parts by weight of carbon black and 0.1 to 5 parts by weight of $CoCl_2 \cdot 2NH_3$ which contains 2 molecules of water, per 100 parts by weight of the rubber, curing the rubber and heating for a sufficient time for ammonia to be given off and for action of the ammine complex to form a strong bond with the zinc.

* * * * *